United States Patent [19]
Miley

[11] Patent Number: 5,729,873
[45] Date of Patent: Mar. 24, 1998

[54] TWO GEAR HOSE CLAMP

[76] Inventor: David C. Miley, 40060 Mertz Dr., SE., Stayton, Oreg. 97383

[21] Appl. No.: 753,740

[22] Filed: Nov. 29, 1996

[51] Int. Cl.⁶ .......................... B65D 63/00; F16L 33/00
[52] U.S. Cl. .......................................................... 24/274 R
[58] Field of Search .............................. 24/274 R, 274 WB, 24/269, 279, 280, 200 W, 20 LS; 285/253

[56] References Cited

U.S. PATENT DOCUMENTS

| | | | |
|---|---|---|---|
| 2,405,913 | 8/1946 | Tinnerman | 24/274 R X |
| 2,408,347 | 9/1946 | Sprouse | 24/274 R |
| 2,938,690 | 5/1960 | Castle | 24/274 R X |
| 4,546,524 | 10/1985 | Kreft | 24/274 R |
| 4,558,493 | 12/1985 | Dowdell | 24/274 R |
| 4,686,747 | 8/1987 | Bakdahl | 24/274 R |
| 4,956,898 | 9/1990 | Miyamura et al. | 24/274 R |
| 5,410,781 | 5/1995 | Anjos et al. | 24/274 R |

*Primary Examiner*—Peter M. Cuomo
*Assistant Examiner*—Robert J. Sandy

[57] ABSTRACT

A new Two Gear Hose Clamp for permitting access to, and operation of, the hose clamp from a variety of angles. The inventive device includes a circular clamping band, a driven worm screw, and a drive shaft perpendicular to the worm screw for driving the worm screw.

9 Claims, 3 Drawing Sheets 5,729,873

1

TWO GEAR HOSE CLAMP

BACKGROUND OF THE INVENTION

1. Field of the Invention

The present invention relates to hose clamps and more particularly pertains to a new Two Gear Hose Clamp for permitting access to, and operation of, the hose clamp from a variety of angles.

2. Description of the Prior Art

The use of hose clamps is known in the prior art. More specifically, hose clamps heretofore devised and utilized are known to consist basically of familiar, expected and obvious structural configurations, notwithstanding the myriad of designs encompassed by the crowded prior art which have been developed for the fulfillment of countless objectives and requirements.

Known prior art hose clamps include U.S. Pat. Nos. 4,637,100; 4,956,898; 4,546,524; U.S. Patent Des. 329,891; U.S. Pat. Nos. 5,315,742 and 5,309,607.

While these devices fulfill their respective, particular objectives and requirements, the aforementioned patents do not disclose a new Two Gear Hose Clamp. The inventive device includes a circular clamping band, a driven worm screw, and a drive shaft perpendicular to the worm screw for driving the worm screw.

In these respects, the Two Gear Hose Clamp according to the present invention substantially departs from the conventional concepts and designs of the prior art, and in so doing provides an apparatus primarily developed for the purpose of permitting access to, and operation of, the hose clamp from a variety of angles.

SUMMARY OF THE INVENTION

In view of the foregoing disadvantages inherent in the known types of hose clamps now present in the prior art, the present invention provides a new Two Gear Hose Clamp construction wherein the same can be utilized for permitting access to, and operation of, the hose clamp from a variety of angles.

The general purpose of the present invention, which will be described subsequently in greater detail, is to provide a new Two Gear Hose Clamp apparatus and method which has many of the advantages of the hose clamps mentioned heretofore and many novel features that result in a new Two Gear Hose Clamp which is not anticipated, rendered obvious, suggested, or even implied by any of the prior art hose clamps, either alone or in any combination thereof.

To attain this, the present invention generally comprises a circular clamping band, a driven worm screw, and a drive shaft perpendicular to the worm screw for driving the worm screw.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of

2 being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Two Gear Hose Clamp apparatus and method which has many of the advantages of the hose clamps mentioned heretofore and many novel features that result in a new Two Gear Hose Clamp which is not anticipated, rendered obvious, suggested, or even implied by any of the prior art hose clamps, either alone or in any combination thereof.

It is another object of the present invention to provide a new Two Gear Hose Clamp which may be easily and efficiently manufactured and marketed.

It is a further object of the present invention to provide a new Two Gear Hose Clamp which is of a durable and reliable construction.

An even further object of the present invention is to provide a new Two Gear Hose Clamp which is susceptible of a low cost of manufacture with regard to both materials and labor, and which accordingly is then susceptible of low prices of sale to the consuming public, thereby making such Two Gear Hose Clamp economically available to the buying public.

Still yet another object of the present invention is to provide a new Two Gear Hose Clamp which provides in the apparatuses and methods of the prior art some of the advantages thereof, while simultaneously overcoming some of the disadvantages normally associated therewith.

Still another object of the present invention is to provide a new Two Gear Hose Clamp for permitting access to, and operation of, the hose clamp from a variety of angles.

Yet another object of the present invention is to provide a new Two Gear Hose Clamp which includes a circular clamping band, a driven worm screw, and a drive shaft perpendicular to the worm screw for driving the worm screw.

Still yet another object of the present invention is to provide a new Two Gear Hose Clamp that improves access to the clamp, thus making it easy to use and saving valuable time.

Even still another object of the present invention is to provide a new Two Gear Hose Clamp that reduces injury to the hands and fingers of people making adjustments to the clamp.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
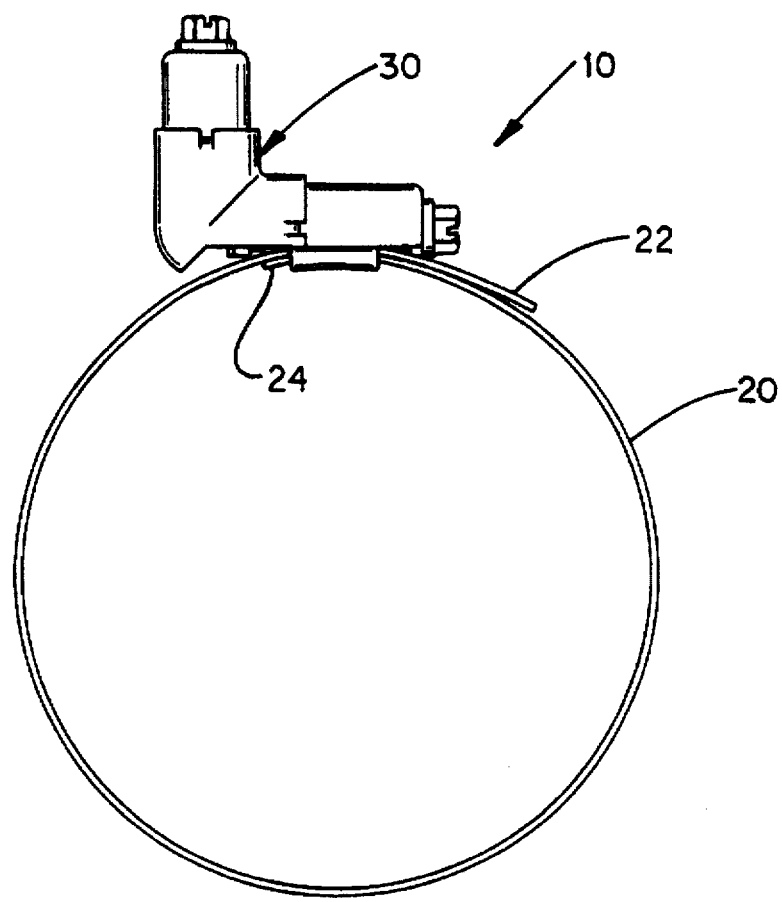
FIG. 1 is an end view of a new Two Gear Hose Clamp according to the present invention.
Figure 2:
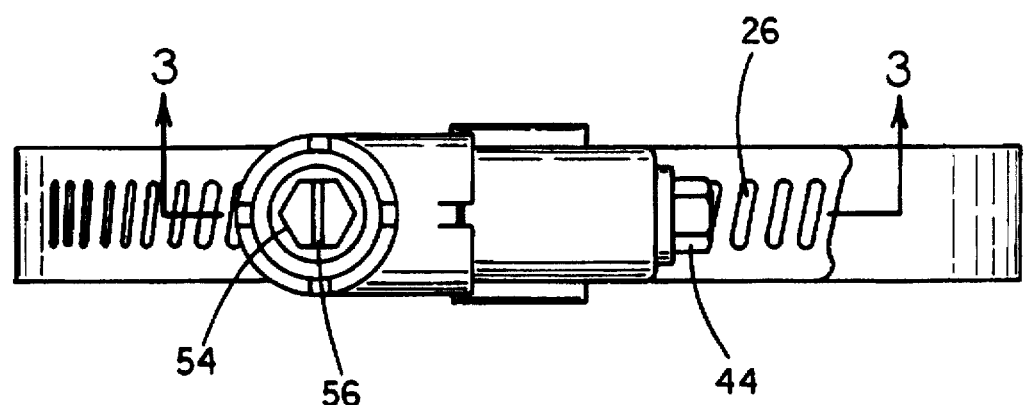
FIG. 2 is a top elevation view thereof.
Figure 3:
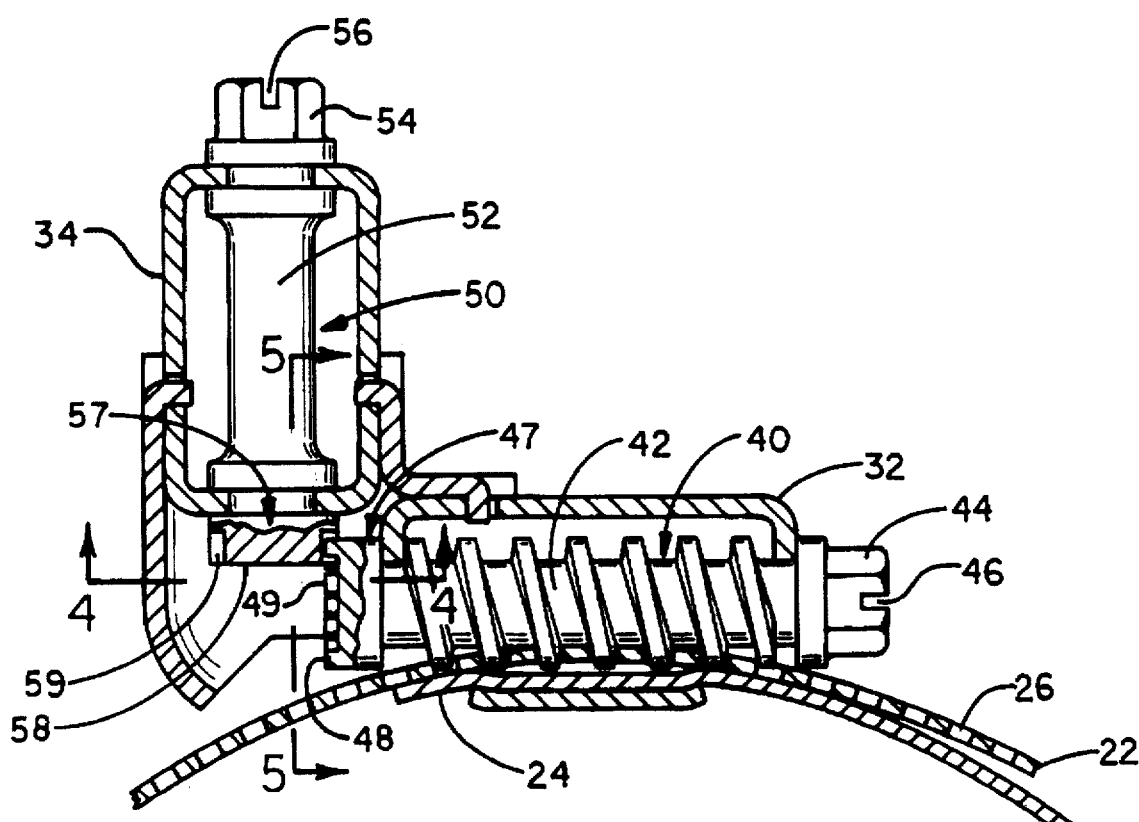
FIG. 3 is a sectional view along line 3—3 of FIG. 2.
Figure 4:
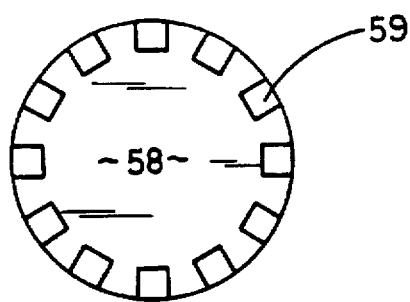
FIG. 4 is a cross sectional view taken along line 4—4 of FIG. 3.
Figure 5:
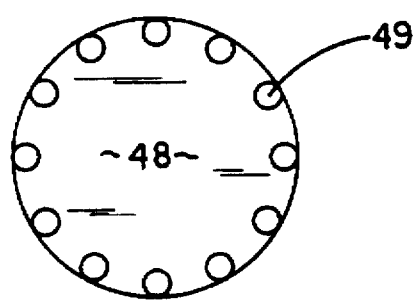
FIG. 5 is a cross sectional view taken along line 5—5 of FIG. 3.
Figure 6:
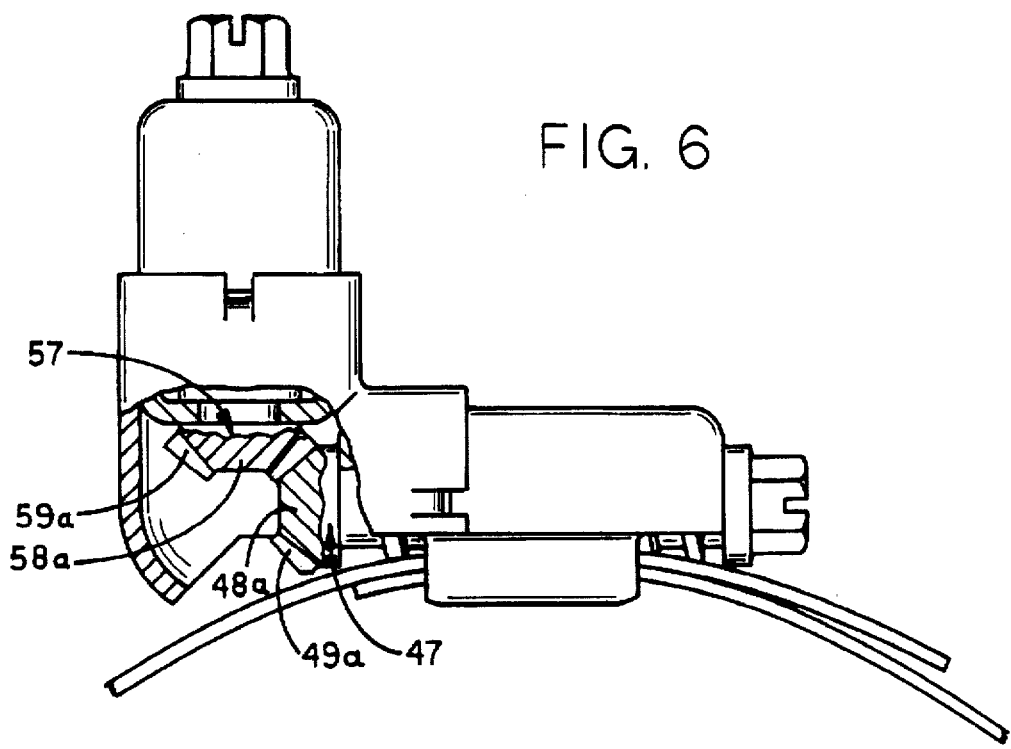
FIG. 6 is a partial sectional view of an alternate embodiment of the present invention.

With reference now to the drawings, and in particular to FIGS. 1 through 7 thereof, a new Two Gear Hose Clamp embodying the principles and concepts of the present invention and generally designated by the reference numeral 10 will be described.

More specifically, it will be noted that the Two Gear Hose Clamp 10 comprises a clamping band 20, a band tightening means housing 30, and driven gear means 40 and drive gear means 50 disposed inside the housing 30.

As best illustrated in FIGS. 1 through 7, it can be shown that the clamping band 20 has overlapping ends 22,24, thus defining a circle for placement around a hose. The band may be made of metal, such as stainless steel or aluminum. The band includes slits 26 near the overlapping end 22, having the same pitch as the threads on the worm screw 42 to be described later. The purpose and function of the slits, and the engagement with the worm screw, is known to those having ordinary skill in the art, and no further description is necessary.

Figure 7A:
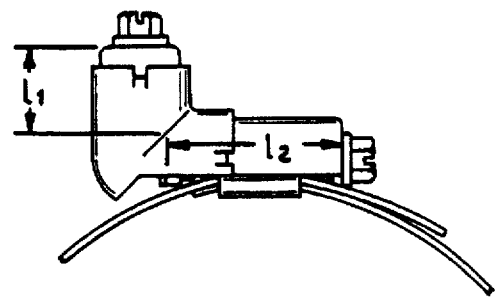
FIGS. 7A and 7B are views of alternate embodiments of the invention.
Figure 7B:
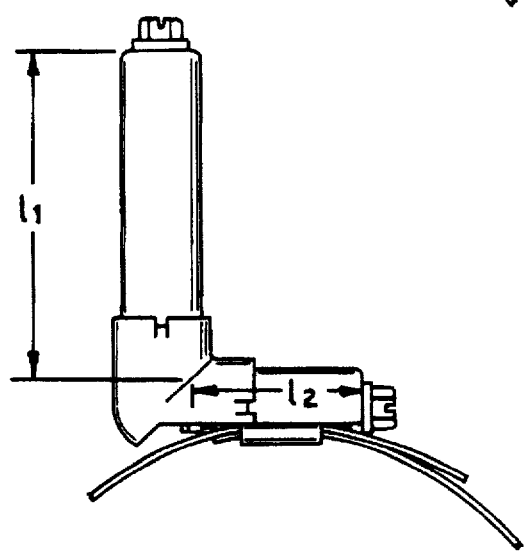

Mounted to the clamping band near its overlapping ends is a band tightening means housing 30 composed of a driven gear means housing 32, housing the driven gear means 40, and a drive gear means housing 34, housing the drive gear means 50. The housing 34 is mounted perpendicularly to the housing 32, forming an "L" shape, the purpose of which will become apparent later in the description. The longitudinal length of the housing 34 can vary depending upon the needs of the user. For instance, referring to FIG. 7A, when access to the clamp is relatively easy or when space is limited, the length $l_1$ of the housing 34 can be made short relative to the length $l_2$ of housing 32, thus reducing the amount of material used in making the clamp. However, as shown in FIG. 7B, the length $l_1$ of the housing 34 can be made long relative to the length $l_2$ of housing 32, thus making it easier for a person to access the clamp with a tool.

Contained substantially within the driven gear housing 32 is the driven gear means 40. The driven gear means 40 includes an elongated worm screw 42 rotationally mounted in the housing 32. The screw is operatively engaged with the slits 26 so that the band is constricted or expanded when the screw is rotated. Located at one end of the screw is a hex head 44 having a driving slot 46 sized for receiving a tool, such as a screw driver, for rotating the worm screw. Located at the other end of the screw is a driven gear 47. The driven gear 47 is comprised of a driven wheel 48 having projecting pins or cogs 49. Alternatively, the driven gear can be comprised of a driven bevel wheel 48a having teeth 49a (FIG. 6), or any other suitable drive connection.

The drive gears means 50, which is substantially contained within the housing 34, is comprised of a drive shaft 52 suitably rotatably mounted within the housing. Located at one end of the drive shaft 52 is a hex head 54 having a driving slot 56 sized for receiving a tool, such as a screw driver, for rotating the drive shaft. A drive gear 57 is mounted at the other end of the drive shaft for driving engagement with the driven gear 47. For engagement with the driven wheel 48 and pins 49, the drive gear 57 is comprised of a drive wheel 58 with recessed slots 59 sized for receiving the pins 49. Alternatively, the drive gear 57 can be comprised of a drive bevel wheel 58a having teeth 59a (FIG. 6), or any other suitable drive connection. As explained previously, the lengths of the housing 34 can be varied depending upon user requirements to provide easier access to the clamp. This variation in length would normally be accommodated by using drive shafts 52 having different lengths, since the hex head and drive gear would normally have a standard size. However, any means for accommodating the variation in length while still transferring drive torque to the driven gear means could be utilized.

In use, the hose clamp is disposed around the hose to be clamped. The user rotates the hex head 54 using a suitable tool, which rotates the drive shaft 52 and the drive gear 57. Rotation of the drive gear 57 causes rotation of the driven gear 47 which rotates the worm screw. Rotation of the worm screw causes constriction or expansion of the clamping band, depending upon the direction of initial rotation of the hex head 54. Alternatively, the user can rotate hex head 44 using a suitable tool, thus causing rotation of the worm screw and constriction or expansion of the clamping band, depending upon the direction of rotation of the hex head 44. The user can therefore choose which hex head to rotate depending upon which hex head is more accessible, thus making the hose clamp easier to use. Additionally, the user can select a hose clamp having a longer drive gear means, such as in FIG. 7B, thus making access to the hose clamp even easier.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hose clamping device comprising:

a clamping band having opposite ends drawn upon themselves to form a circle; and clamping band tightening means operably associated with said clamping band for selectively constricting and expanding the clamping band;

said clamping band tightening means including a driven gear means in engagement with said clamping band and a drive gear means rotationally driving said driven gear means upon rotation of said drive gear means;

wherein said drive gear means and said driven gear means each have a longitudinal length, and the length of said drive gear means is greater than the length of said driven gear means.

2. The hose clamping device of claim 1, wherein said drive gear means is disposed at an angle relative to said driven gear means.

3. The hose clamping device of claim 2, wherein said angle is approximately 90 degrees.

4. The hose clamping device of claim 1, wherein said drive gear means comprises an elongated drive shaft, a hex head having a driving slot at one end of the drive shaft, and a drive gear at the other end of the drive shaft; and said driven gear means comprises an elongated worm screw, a hex head having a driving slot at one end of said worm screw, and a driven gear, in engagement with the drive gear, at the other end of the worm screw.

5. The hose clamping device of claim 4, wherein said drive gear comprises a drive wheel with recessed slots disposed around the periphery of the wheel, and said driven gear comprises a driven wheel with projecting pins disposed around the periphery of the driven wheel, said slots and pins being sized for operative engagement.

6. The hose clamping device of claim 4, wherein said drive gear and said driven gear comprise bevel gears.

7. The hose clamping device of claim 1, wherein said drive gear means and said driven gear means each have a longitudinal length, and the length of said drive gear means is less than the length of said driven gear means.

8. A hose clamping device comprising:

a clamping band having opposite ends drawn upon themselves to form a circle; and clamping band tightening means operably associated with said clamping band for selectively constricting and expanding the clamping band;

said clamping band tightening means including a driven gear means in engagement with said clamping band and a drive gear means, disposed at a 90 degree angle relative to said driven gear means, rotationally driving said driven gear means upon rotation of said drive gear means;

said drive gear means comprising an elongated drive shaft, a hex head having a driving slot at one end of the drive shaft, and a drive gear at the other end of the drive shaft; and said driven gear means comprises an elongated worm screw, a hex head having a driving slot at one end of said worm screw, and a driven gear, in engagement with the drive gear, at the other end of the worm screw;

wherein said drive gear means and said driven gear means each have a longitudinal length, and the length of said drive gear means is greater than the length of said driven gear means.

9. The hose clamping device of claim 8, wherein said drive gear means and said driven gear means each have a longitudinal length, and the length of said drive gear means is less than the length of said driven gear means.

* * * * *